Feb. 23, 1965  G. SIDDALL ETAL  3,171,017
EVAPORATION OF METAL OR METALLOIDS
Filed Jan. 18, 1960
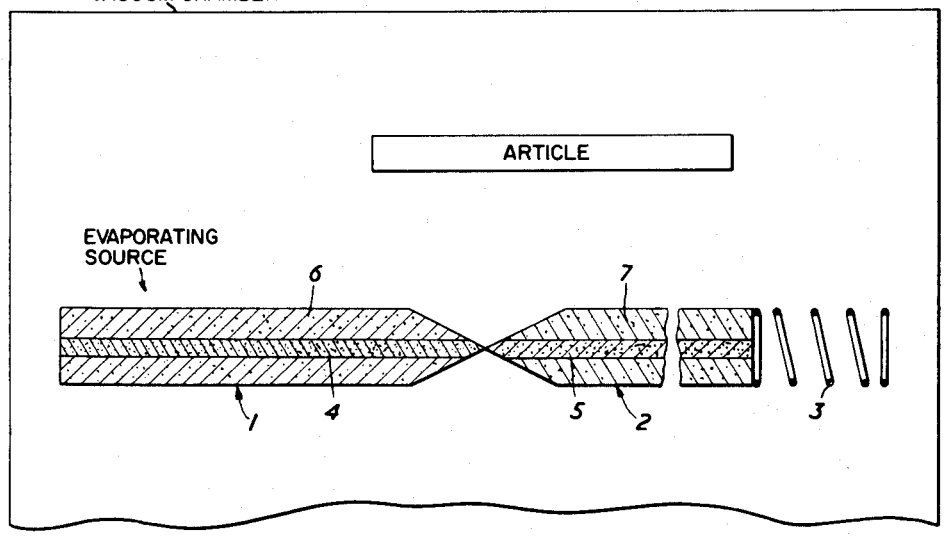
GEORGE SIDDALL,
LESLIE A. HOLLAND and
ALFRED HILLIARD
INVENTORS
BY *Hall & Houghton*
ATTORNEY

United States Patent Office 3,171,017
Patented Feb. 23, 1965

3,171,017
EVAPORATION OF METAL OR METALLOIDS
George Siddall and Leslie A. Holland, Crawley, and Alfred Hilliard, London, England, assignors to Edwards High Vacuum Limited, Crawley, England, and Société le Carbone-Lorraine, Paris, France
Filed Jan. 18, 1960, Ser. No. 3,166
Claims priority, application Great Britain, Jan. 16, 1959, 1,753/59
2 Claims. (Cl. 219—271)

This invention relates to the evaporation of metals and metalloids particularly in vacuum deposition processes.

Various forms of metal or metalloid vapour sources are known including the use of electrically heated crucibles containing the metal or metalloid to be vaporized and resistance or induction heating or electron bombardment of small masses, sometimes in the form of a wire, of the metal or metalloid to be vaporized. It is also known for the purpose of producing thin films to utilize the heat produced by an electric arc discharge to vaporize materials composing the arc electrodes.

One of the difficulties experienced in the use of the arc method is that the arc is difficult to sustain when the supply of gas ions has decreased due to the low working pressure required for deposition by evaporation. This difficulty has been overcome either by vibrating one arc electrode so that the arc is intermittently remade or by using a direct current power supply of sufficient power to maintain a high vapour density.

Vapour sources are also known in which in minute contact area is maintained between pointed or tapered ends of the electrodes when it is likely that the heating may be due to the Joule effect. Localised arcing may still occur when very sharply pointed electrodes are placed in contact and the material at the point of contact is rapidly evaporated. Both the arc and resistance methods of heating a vapour source have already been used with particular advantage for the evaporation of high melting point metals such as tungsten, platinum, etc., or metalloids made in the form of rod-like electrodes.

The present invention concerns the construction of electrodes suitable for use where the materials to be evaporated cannot easily be prepared in rod form and are expensive to use or may lose their structural strength when heated during evaporation, and according to the present invention, a material to be evaporated under vacuum for the purpose of producing a thin film of the material is supported by a holder, the material preferably constituting a part or the whole of a core of an elongated electrode which may be of cylindrical rod form. The core material may consist of a pure metal or a metalloid or an alloy of metals or a mixture of a metal and a metalloid, or it may be made from any electrically conducting material which can be rendered into the vapour state by heating. The shell of the rod may consist of a refractory material such as carbon or tungsten, or a metal carbide. In a further application of the invention, the outer electrode shell may be made from a non-conducting refractory material for example a ceramic tube, the core consisting of the material to be vaporized which should be electrically conducting.

Cored electrodes constructed in accordance with the invention will now be described in greater detail by way of example with reference to the accompanying diagrammatic drawing which shows an elevation in section of such electrodes.

Referring to the drawing, each co-operating electrode indicated generally as 1 and 2 is supported by means, not shown, with their points lightly held in contact by a spring 3. Each core 4 and 5 composed of the material to be evaporated is compressed, sintered or held by a binder so that it does not disintegrate when the electrode ends are tapered and the cores exposed beyond the individual outer shells 6 and 7 as shown in the drawing. If the core material is held together by a binder then an organic material is preferably used which will volatize without unduly contaminating the evaporated deposit, if this is to be of pure material.

In one method of making electrodes embodying the invention, a core of powdered material is mixed with a binder and surrounded by a refractory material shell also held together by a binding agent. The required electrode form is produced by extrusion and the extruded section sintered at a suitable temperature at which the binders are also volatilized. If the outer shell is a carbide then the binder may be metallic and need not evaporate during sintering. The electrode may also be prepared in the shape of a tube and the core material added as a second stage.

In a specific form of electrode embodying the invention, a carbon electrode is provided with a core of a platinum/carbon mixture. A pair of such electrodes has been used to evaporate a mixture of platinum and carbon by resistance heated contact for use in the preparation of electron microscope specimens by shadow casting. The platinum/carbon core is exposed by cutting a taper at the end of the electrode and a resistance heated contact is maintained between the exposed cores. As the tip of the electrode is consumed, the outer shell of carbon is cut away to expose more of the core. In this way the preferred core composition is maintained in the deposited film and only a small quantity of the expensive platinum metal is used in the preparation of the electrodes. In addition to the saving of the active platinum, the fact that it is dispersed in a refractory non-fusible material has the advantage that spluttering of the platinum even after it has become molten is prevented. The advantage referred to applies to mixtures of other active and refractory materials.

In an alternative form of electrode embodying the invention a refractory rod has a core of a solid metal rod, for example, bismuth, which is known to melt during arc evaporation. However, once the electrode contacts have resistance heated the metal the point material evaporates allowing successive evaporation to occur by electric arc heating from liquid bismuth in the core.

A further application of the invention permits the use of expensive core materials, e.g., platinum, in connection with an inexpensive holder material in such a way that any waste of the expensive core material is either avoided or reduced to a minimum. Thus the holder material may be a carbon rod, provided with an axial hole, or like orifice at one end only. The axial hole is filled with the core material, e.g., platinum or a platinum/carbon mixture. By such a method of holding or supporting the material to be vaporized it is possible to use up fully all the expensive core material at a uniform rate and to avoid waste of the material in the parts of the electrode which are held by clamps or used for the requisite electrical connections or which, for other reasons, cannot be consumed directly in the process.

If carbon is used as the holder material, it has also the advantage that it permits the control of certain physical properties, e.g., thermal and electrical conductivity of the holder material over a fairly wide range. By controlling the degree of graphitisation of the carbon holding (or shell) member, its electrical conductivity can, for example, be adjusted to be similar to that of the core material. This application of the invention therefore permits considerable latitude in the control of the physical properties and characteristics of the product more easily than is possible with other forms.

Carbon rods cored only at one end as described provide the electron microscopist with a further useful facility.

It is well known to prepare replicas for electron microscopy by evaporating from pointed carbon rods pressed together, so that if the microscopist is provided with carbon electrodes cored at one end only with material to be vaporized and both ends are pointed, then such electrodes need only be turned in their holders to enable them to be used to evaporate either carbon alone or a selected core material, as required.

In using any electrode embodying the invention, although the core is preferably heated by an arc or by resistance heating, it is not essential that it be initially conducting. Thus, materials are known which become conducting as their temperature rises and the rod may be pre-heated by some external source, for example by passing an electric current through the shell of one of the electrodes if this is made from a material such as carbon.

Although in the description referring to the drawing two electrodes made in accordance with the invention are shown as providing a vapour source, one cored electrode embodying the invention may be used to provide a vapour source in conjunction with a plain electrode. Thus, in the evaporation of a platinum and carbon mixture it is often desirable to use one carbon electrode cored with the platinum and carbon mixture in conjunction with a plain carbon electrode. This practice extends the scope of application of the invention by permitting the percentage of platinum to be deposited in the film to be reduced by approximately half the figure to be expected when a pair of cored electrodes are used.

It will be seen that the invention provides a resistance heated or arc vapour source in which the cored component permits the use of small quantities of expensive material, substances which cannot be produced in structurally rigid form or which soften when heated to evaporation temperatures.

We claim:
1. An evaporator source of a material to be vaporized under vacuum for producing a film of said material, said source comprising:
   an elongate tubular shell, and a core member in said shell and consisting of a mixture of carbon and platinum as the material to be vaporized;
   an elongate tubular member of an electrically conductive material, said core member projecting outwardly of its shell and said members being shaped to define limited areas at their ends, said member ends abutting and making contact at a limited area of the material to be vaporized; and
   means resiliently urging said members into contact with each other so that passage of electric current through the members will cause vaporization of the material from the limited area of contact.

2. An evaporator source of a material to be vaporized under vacuum for producing a film of said material, said source comprising:
   a first elongate tubular shell, and a core in said shell and consisting of a mixture of carbon and platinum as the material to be vaporized;
   a second elongate tubular shell, and a core in said shell and consisting of a mixture of carbon and platinum as the material to be vaporized, said cores projecting outwardly of their respective shells and shaped to define limited areas at their ends, said core ends abutting and making contact at a limited area of the material to be vaporized; and
   means resiliently urging said cores into contact with each other so that passage of electric current through the cores will cause vaporization of the material from the limited area of contact.

References Cited by the Examiner
UNITED STATES PATENTS

| | | | |
|---|---|---|---|
| 533,932 | 2/95 | Thomson | 313—354 |
| 552,498 | 12/95 | Mosher | 313—354 X |
| 660,852 | 10/00 | Hachmann | 313—354 |
| 1,162,149 | 11/15 | Eckhardt | 117—93.1 |
| 1,700,454 | 1/29 | Schumacher | 313—354 |
| 1,896,789 | 2/33 | Scott | 13—9 |
| 1,926,336 | 9/33 | Hunter | 204—192 X |
| 1,940,814 | 12/33 | Seager | 204—192 X |
| 2,127,757 | 8/38 | Saracco | 313—354 X |
| 2,229,227 | 1/41 | Simon et al. | 313—354 |
| 2,797,351 | 6/57 | Greider | 313—354 |
| 2,825,687 | 3/58 | Preston et al. | 204—192 |
| 2,843,542 | 7/58 | Callahan | 204—192 |
| 2,876,151 | 3/59 | Helin et al. | 117—202 X |
| 2,896,108 | 7/59 | Segal | 13—9 X |
| 2,922,028 | 1/60 | Butter et al. | 219—145 |
| 2,930,879 | 3/60 | Scatchard | 117—93 |
| 2,980,532 | 4/61 | Martensson et al. | 204—192 |

FOREIGN PATENTS

| | | |
|---|---|---|
| 688,389 | 12/38 | Germany. |
| 754,614 | 8/56 | Great Britain. |

RICHARD M. WOOD, *Primary Examiner.*

MILTON O. HIRSHFIELD, *Examiner.*